United States Patent
Assaad et al.

(10) Patent No.: US 12,294,242 B2
(45) Date of Patent: May 6, 2025

(54) COOLING SYSTEM FOR AN ELECTRIC MACHINE

(71) Applicant: Nissan Motor Co., Ltd., Yokohama (JP)

(72) Inventors: Bassel Assaad, Saint Cyr L'école (FR); Edouard Negre, Montigny-le-Bretonneux (FR)

(73) Assignee: Nissan Motor Co., Ltd., Yokohama (JP)

( * ) Notice: Subject to any disclaimer, the term of this patent is extended or adjusted under 35 U.S.C. 154(b) by 283 days.

(21) Appl. No.: 17/933,880

(22) Filed: Sep. 21, 2022

(65) Prior Publication Data

US 2023/0036400 A1    Feb. 2, 2023

Related U.S. Application Data

(63) Continuation of application No. PCT/EP2021/058951, filed on Apr. 6, 2021.

(30) Foreign Application Priority Data

Apr. 16, 2020    (FR) ........................................ 2003828

(51) Int. Cl.
  *H02K 9/19* (2006.01)
  *H02K 1/20* (2006.01)
  *H02K 5/12* (2006.01)
(52) U.S. Cl.
  CPC ................ *H02K 1/20* (2013.01); *H02K 5/12* (2013.01); *H02K 9/19* (2013.01)

(58) Field of Classification Search
  CPC .. H02K 9/00; H02K 9/08; H02K 9/19; H02K 9/193; H02K 9/20; H02K 5/00;
  (Continued)

(56) References Cited

U.S. PATENT DOCUMENTS 2,736,825 A * 2/1956 Hill ........................ H02K 5/132
                                                              310/87
2008/0047799 A1    2/2008 Combes et al.
(Continued)

FOREIGN PATENT DOCUMENTS

DE        19824202 C1    9/1999
EP        1841046 A1    10/2007
(Continued)

*Primary Examiner* — Tran N Nguyen
(74) *Attorney, Agent, or Firm* — Global IP Counselors, LLP

(57) ABSTRACT

A cooling system cools an electric machine including a casing, a rotor rotatably supported by the casing, and a stator fixed to the casing. The cooling system includes a flow circuit that brings a cooling liquid into contact with active parts of the electric machine. A main reservoir is provided in a lower portion of the casing. A pump injects the cooling liquid into the flow circuit. The level of cooling liquid in the casing interfaces with a lower portion of the rotor when the pump stops. A controller controls the pump to stop the pump when a temperature of the cooling liquid is below a given threshold, and start the pump as soon as the temperature of the liquid reaches the threshold such that the liquid is drawn by the main reservoir pump towards a secondary reservoir to lower the level of cooling liquid in the casing.

10 Claims, 2 Drawing Sheets

(58) Field of Classification Search
CPC ............ H02K 5/12; H02K 5/20; H02K 5/203;
H02K 11/00; H02K 11/02; H02K 11/05;
H02K 11/25
See application file for complete search history.

(56) References Cited

U.S. PATENT DOCUMENTS

| | | |
|---|---|---|
| 2011/0084561 A1 | 4/2011 | Swales et al. |
| 2014/0217842 A1* | 8/2014 | Kikuchi .................. H02K 9/19 |
| | | 310/54 |
| 2019/0173359 A1 | 6/2019 | Ishikawa et al. |

FOREIGN PATENT DOCUMENTS

| | | | | |
|---|---|---|---|---|
| EP | 2213497 A1 | 8/2010 | | |
| JP | 2014-30296 A | 2/2014 | | |
| JP | 2016-201959 A | 12/2016 | | |
| WO | WO2017142457 A1 * | 8/2017 | ............... | H02K 9/19 |
| WO | 2018/206890 A1 | 11/2018 | | |

* cited by examiner

COOLING SYSTEM FOR AN ELECTRIC MACHINE

CROSS-REFERENCE TO RELATED APPLICATIONS

This application is a continuation application of International Application No. PCT/EP2021/058951, filed on Apr. 6, 2021. This application claims priority to French Application No. 2003828, filed on Apr. 16, 2020. The entire disclosures of the International Application No. PCT/EP2021/058951 and the French Application No. 2003828 are hereby incorporated herein by reference.

BACKGROUND

Technical Field

The invention generally relates to cooling systems for cooling the electric machines such as electric motors of vehicles. More specifically, the invention relates to a cooling system for cooling and lubricating an electric machine used in a motor vehicle.

Background Information

The electric machines generally comprise a stator and a rotor arranged coaxially with each other. The rotor is formed of a rotor body carrying magnetic flux generators, such as permanent magnets or windings. This rotor is generally housed within the stator which carries magnetic flux generators in the form of windings for generating a magnetic field for rotating the rotor in association with the magnetic field generated by the magnets or the windings of the rotor.

The cooling of the windings of an electric machine plays an essential role because, among the efficiency losses of an electric machine, a significant proportion is taken by the Joule losses which are proportional to the temperature of the wire of the windings.

Cooling systems of electric machines are known in which an oil-type cooling liquid is circulated on the active parts of these electric machines, in particular their windings. The patent document WO2018/206890 thus makes it possible to know such a system mainly comprising an oil circulation circuit capable of bringing the oil into contact with the active parts of the electric machine, via injectors enabling the active parts to be sprayed with oil, a reservoir capable of collecting the oil having cooled these active portions, a pump, making it possible to re-inject the oil from the reservoir to the circulation circuit and a heat exchanger, making it possible to maintain the temperature of the oil below a temperature threshold. This arrangement makes it possible to guarantee both the lubrication of the rotating parts of the machine (dynamic seals and bearings) and the cooling of the active parts of the machine (rotor and stator) so that the latter does not overheating.

SUMMARY

However, it has bee found that cooling systems such in patent document WO2018/206890 are generally expensive in particular due to the presence of the pump, the latter being an electric pump and not a mechanical pump, because of low speed and high torque demand, the cooling of the machine should be maximum.

This pump is dimensioned with respect to the requirements of the system. In the case of a sealed electrical machine, the seals and bearings must be permanently lubricated. In other words, for lubricating purposes, it is necessary to maintain the pump in operation in order to ensure a minimum flow of oil continuously regardless of the conditions and, in particular, regardless of the temperature of the oil. Thus, cold, on negative oil temperature ranges and below a certain threshold, no cooling is required and the circulation of oil provided by the pump of the circuit serves only to lubricate the seals and the bearings of the machine.

However, the dimensioning of the pump depends on the viscosity of oil. This viscosity is very large at negative temperatures and rapidly decreases to converge at low viscosities from a temperature threshold. In cold, the large oil viscosities impose a significant pressure in the circuit, which requires a greater torque demand to the pump and, as a result, oversizing of the pump, at the expense of the cost.

Another problem lies in the noise emitted by the pump, in particular at low engine speed, for example during maneuvers in a parking lot or in traffic jam of a neck mounted under these conditions, the noise emitted by the pump is greater than the noise emitted by the electric motor, which is obviously not desirable.

In addition, systems are also known for cooling the rotor during operation, in which the active parts of the machine are cooled and the seals and bearings are lubricated by the oil projected by the rotor when the latter rotates. However, the rotational speed of the machine is a factor limiting the proper operation of the machine. Indeed, the increase in rotational speed, starting from a certain operating regime, significantly increases the frictional losses due to oil in the air gap and on the surfaces of the rotor. In other words, this system makes it possible to operate efficiently only on a variation interval of the rotation speed of the relatively limited motor, except for degrading the efficiency of the machine.

Also, there is a need for a cooling system of an electric machine, in particular of an electric traction machine of an electric or hybrid vehicle, which is at least partially free of the limitations previously mentioned.

To this end, a cooling system is disclosed in this disclosure for cooling an electric machine including a casing, a rotor having a rotary shaft supported by at least one bearing housing of the casing receiving end of the rotary shaft via a bearing, a stator fixed to an inner wall of the casing and surrounding the rotor. The cooling system basically comprises a circulation circuit, a main reservoir, a secondary reservoir, a pump and an electronic controller. The circulation circuit is configured to bring a cooling liquid into contact with active parts of the electric machine. The main reservoir is located at a lower part of the casing, and is configured to receive the cooling liquid. The a pump is connected to the main reservoir, and configured to inject the cooling liquid into the circulation circuit. The electronic controller is operatively coupled to the pump to control the pump as a function of at least a temperature of the cooling liquid. The main reservoir has a liquid volume such that a level of the cooling liquid in the casing interfaces with a lower part of the rotor where the pump is stopped and the casing is filled with the cooling liquid. The circulation circuit fluidly communicates with a secondary reservoir located at an upper part of the casing. The electronic controller is configured to maintain the pump off when the temperature of the cooling liquid is below a prescribed threshold so that the cooling liquid is splashed around in the casing by rotation of the rotor and accumulated in a receptacle attached to a surface of the casing on a side of the bearing housing. The receptacle is configured to guide the cooling liquid towards the bearing housing to lubricate and cool the bearing. The electronic controller is further configured to start the pump upon the temperature of the cooling liquid reaching the prescribed threshold, so that the cooling liquid is sucked by the pump from the main reservoir into the circulation circuit and to the secondary reservoir, and lowering the level of the cooling liquid in the casing.

Thus, with this cooling system, when the temperature of the cooling liquid, typically oil, is less than the given threshold, adapted to correspond to a cold operation where the viscosity of the oil is high, i.e., a threshold of 0° C., the cooling of the rotor and of the stator as well as the lubrication of the machine are ensured by solely bubbling of the rotor, which makes it possible to project the oil into the casing, in particular in the receptacle suitable for guiding the oil towards the bearing housing and this, without the use of the pump. The latter therefore does not need to be dimensioned to meet high requirements in terms of oil viscosity, since it is not biased during cold operating phases where there is a need for lubrication or cooling. The requested power and the maximum torque required for the pump can thus be reduced, the pump being only biased at oil temperatures above the predefined threshold, involving a low viscosity of the oil.

Thus, as soon as the temperature of the oil reaches the predefined threshold, primarily for positive temperatures, the start of the pump is controlled and the oil is thus supplied to the circulation circuit which will ensure the filling of the secondary reservoir, while the oil level in the casing will simultaneously decrease, so that the contact between the lower part of the rotor and the oil will be limited, which is particularly favorable to the operation of the electric machine for high rotational speeds due to the significant reduction of the friction losses due to oil, which is derived therefrom. The cooling and lubrication are then ensured essentially by the circulation of the oil by the pump in the circulation circuit intended to spray the active parts of the machine. This cooling mode is not limited by the rotational speed of the motor, which makes it possible to extend the operating speed of the machine and this, without impact on its efficiency, as opposed to the cooling and lubrication mode by the only bubbling of the rotor.

In other words, the selection permitted by the cooling system of the present disclosure, as a function of the temperature of the oil, between a cooling and lubrication mode with a pump at the stop, by the only bubbling of the rotor in the oil, and a cooling and lubrication mode with a started pump, by essentially spraying oil onto the parts of the machine to be cooled and lubricating, through the circulation circuit and the secondary reservoir.

Advantageously, it is possible to provide an optimal dimensioning of the pump, while increasing the operating speed of the machine, without impact on its efficiency, mainly at positive temperatures.

Advantageously, the secondary reservoir comprises at least one outlet arranged at the periphery of the stator, provided with a variable flow nozzle capable of spraying a portion of the longitudinal outer surface of said stator with cooling liquid.

Advantageously, the secondary reservoir comprises two outlets situated opposite each other or a discharge spraying a central peripheral part of said stator.

Advantageously, said circulation circuit comprises adjustable flow nozzles arranged in the casing so as to spray coil heads of the rotor and said bearing housing.

Advantageously, the electronic controller are adapted to control the flow rate of the pump as a function of the level of oil in the casing.

Advantageously, the electronic controller are adapted to control the flow rate of the pump as a function of the temperature of the active parts of the machine.

Advantageously, the electronic controller are adapted to control the flow rate of the pump as a function of the lubrication requirement of the machine.

Advantageously, the electronic controller are adapted to at least limit the speed of the pump, or even to stop it, when the noise emitted by the pump is greater than the noise emitted by said electric machine.

Advantageously, said receptacle is adapted to conform to an upper angular portion of the bearing housing on which it is arranged and to communicate, via a channel passing through this upper angular portion of the bearing housing, with a space between the bearing and a dynamic seal extending the casing wall to seal the machine at the output of the rotary shaft.

The present disclosure also relates to an electric or hybrid motor vehicle comprising an electric traction machine and a cooling system of said machine as described above.

Other features and advantages of the invention will appear clearly from the description, which is made hereinafter, by way of illustration and in no way limiting, with reference to the annexed drawings.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the vehicle field from this disclosure that the following descriptions of the embodiments are provided for illustration only and not for the purpose of limiting the invention as defined by the appended claims and their equivalents.

Figure 1:
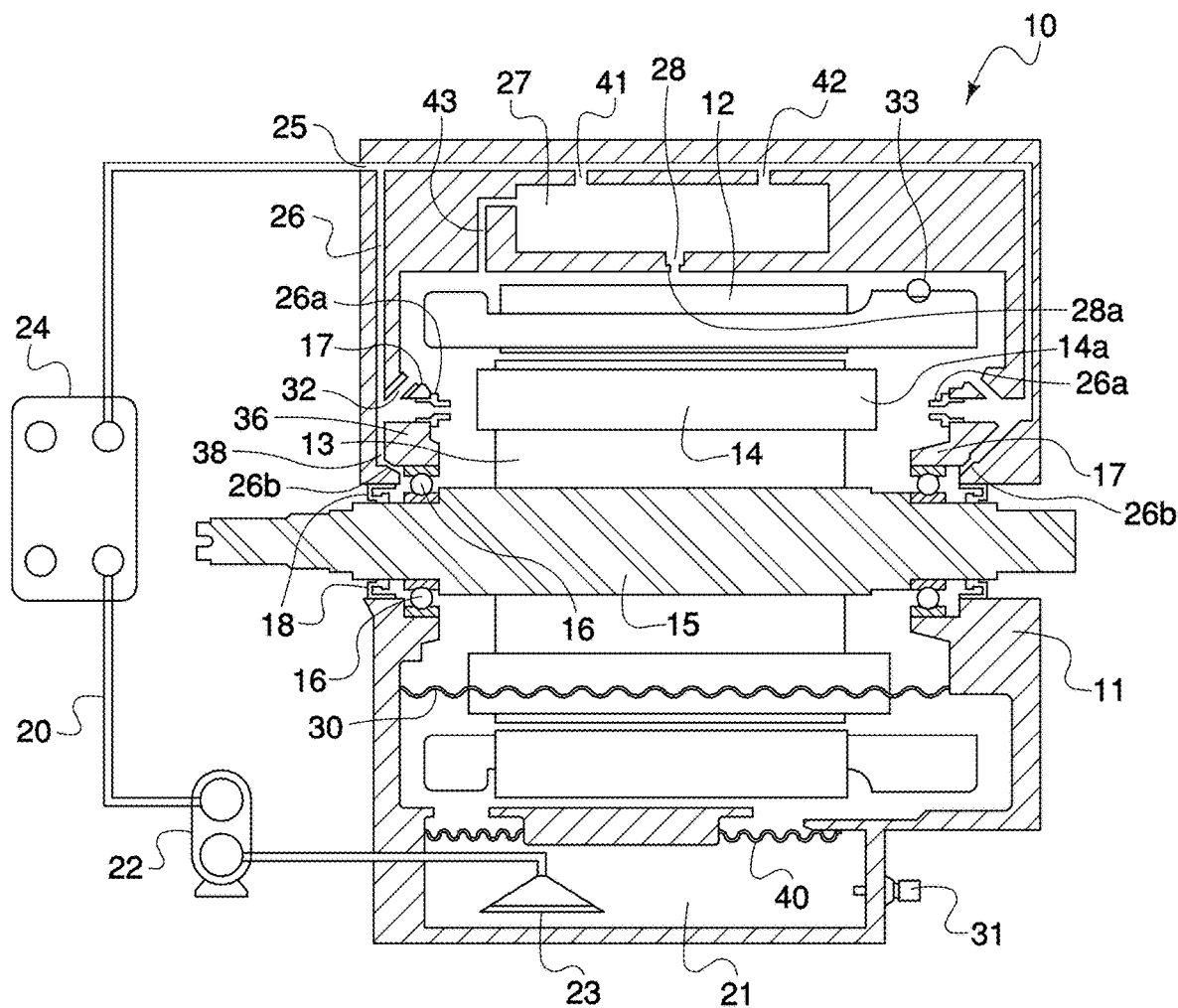
FIG. 1 is a schematically represents in longitudinal section an electric machine cooled by the cooling system according to one illustrative embodiment.

According to the disclosed embodiment shown in FIG. 1, the cooling system according to the invention is intended to cool an electric machine 10, in particular an electric traction machine of an electric or hybrid vehicle. This electric machine 10 comprises a casing 11, a stator 12 and a rotor 13. The stator 12 is fixed to the casing 11. The stator 12 mainly comprises a stack of magnetic sheets and of copper coils inserted into notches in the stack of sheets. The rotor 13 is housed in the stator 12 according to the illustrated embodiment. The rotor 13 mainly comprises a stack of magnetic sheets forming salient magnetic poles around which are wound a plurality of coils 14 made of copper. The rotor 13 is mounted on a rotary shaft 15 that is fixed on one hand to the rotor 13 and on the other hand to the casing 11 of the electric machine 10. The ends of the rotary shaft 15 are held in a pair of ball bearings 16. For example, here, the bearings 16 includes a plurality of balls, mounted on the rotary shaft 15 and housed in substantially cylindrical bearing housings 17 formed in the vertical walls of the casing 11.

In particular, the ball bearings 16 are housed in a cylindrical inner portion of the bearing housings 17. A dynamic seal 18 seals the axial end of the electrical machine at the ball bearing 16.

A cooling system according to the present disclosure is used to cool the active parts of the electric machine 10, that include the stator 12 and the rotor 13, as well as to lubricate and cool the joints and the ball bearings 16.

For this purpose, the cooling system comprises in particular a circulation circuit 20 making it possible to contact a cooling liquid, by spraying this liquid, preferably oil, on these elements of the electric machine 10. The oil is injected into the circulation circuit 20 from a main reservoir 21 situated at the lower part of the casing under the machine, via a pump 22. A strainer system 23 and pipes supplies the oil from the main reservoir 21 to the pump 22. The pump 22 is connected by a pipe to a heat exchanger 24 for supplying the pumped oil to the heat exchanger 24. The heat exchanger 24 is configured to cool the oil received from the pump 22 before re-injecting it to the circulation circuit 20. With this arrangement, it is possible to bring and project the oil which has been cooled at the heat exchanger 24, directly onto the heated elements of the electric machine 10. The oil thus projected recovers the calories produced by the electric machine 10 and then the oil returns to the main reservoir 21 by gravity.

The circulation circuit 20 comprises a line connected at the outlet of the exchanger 24, which brings the cooled oil from the bottom of the casing 11 to an inlet 25 of the casing 11. The inlet 25 of the casing 11 is located at an upper part of the casing 11 of the electric machine 10. Here, the inlet 25 is formed in a vertical wall of the casing 11 of the electric machine 10. This inlet 25 brings the cooled oil from the heat exchanger 24 to a passage 26 provided in vertical wall of the casing 11. The passage 26 leads, on the one hand, to one or more nozzles 26a situated to face the coil heads 14a of the rotor 13, and, on the other hand, to one or more nozzles 26b situated to face the bearing 16 of the rotary shaft 15 of the electric machine 10. These nozzles 26a and 26b are preferably adjustable flow rate nozzles having a variable flow rate. The inlet 25 also supplies the cooled oil to the upper inlets 41 and 42 of a secondary reservoir 27. The secondary reservoir 27 is located at the upper part of the casing, at the top of the electric machine 10. This secondary reservoir 27 extends over substantially the entire length of the stator 12, at the periphery thereof. The secondary reservoir 27 is intended to be filled with oil. The secondary reservoir 27 has a central outlet 28 located on the lower part of the secondary reservoir 27. The central outlet 28 is arranged at the periphery of the stator 12. Preferably, the central outlet 28 is arranged provided with an adjustable flow rate nozzle 28a. Preferably, the adjustable flow rate nozzle 28a of the central outlet 28 can spray the cooling liquid (e.g., oil) at variable flow rate. Thus, it possible to spray cooling liquid (e.g., oil) a central portion of the longitudinal external surface of the stator 12. Alternatively, the secondary reservoir 27 can comprise two outlets arranged opposite each other, preferably substantially at the respective longitudinal ends of the secondary reservoir 27. Preferably, the secondary reservoir 27 comprises an additional outlet 43 for overflow to avoid the total filling of the secondary reservoir 27.

After, the cooling liquid (e.g., oil) is sprayed from the cooling nozzles 26a to cool the stator 12 and the rotor 13, the cooling liquid (e.g., oil) descends by gravity into the main oil reservoir 21. In parallel, after, the cooling liquid (e.g., oil) is sprayed the lubrication nozzles 26b to lubricate the bearings 16, the cooling liquid (e.g., oil) also descends by gravity into the main oil reservoir 21. The flow rate of the lubrication nozzles 26b is preferably adjusted so that it is lower than the flow rate of the cooling nozzles 26a.

Moreover, according to the present disclosure, the liquid volume of the main reservoir 21 is adapted so that the oil level in the casing reaches a level 30 interfacing with a lower portion of the rotor when the pump 22 stops. As illustrated in FIG. 1, the oil level 30 in the lower part of the electric machine 10 is located at the lower winding of the rotor 13. Thus, the lower part of the rotor 13 is immersed in the cooling liquid (e.g., oil).

Advantageously, the temperature Toil of the oil is measured by a temperature sensor 31, installed in the main oil reservoir 21.

A first cooling mode is now described, referred to as cold, when the temperature of the oil measured by the temperature sensor 31 is less than a predefined temperature threshold. This threshold advantageously makes it possible to define the temperatures for which the viscosity level of the oil is such that it would require a high torque demand to the pump 22 in order to circulate the oil in the circulation circuit 20. This predefined threshold is, for example, preferably fixed to 00, the viscosity of the oil being very large at negative temperatures.

Also, in order to avoid having to size the pump accordingly, when the temperature of the oil measured by the temperature sensor 31 is less than a preset temperature threshold, the pump 22 is controlled to stop. A level sensor 34 is provided in the casing 11 to measure the oil level Loil in the casing 11. The oil level Loil in the casing 11 fluctuates depending on the pumping state of the pump 22. The oil level Loil in the casing 11 is located at the level 30 as illustrated in FIG. 1, so that the lower part of the rotor 13 is immersed in the oil, when the machine 10 is in operation, due to the rotation of the rotor 13 coupled to the rotary shaft 15, the oil will be projected into the casing 11 by bubbling the rotor 13. More specifically, the rotational movement of the rotor 12 while at least partly immersed in the oil causes the oil to cover the entire cylindrical surface of the rotor 13, thereby cooling the windings of the rotor 13. The oil is further projected or splashed by the rotor 13 on the cylindrical inner surface of the stator 12, thereby cooling the stator windings.

A portion of the projected oil is further accumulated in a receptacle 32, attached to the surface of the housing side of the bearing housing 17. The receptacle 32 is adapted to guide the recovered oil to the bearing housing to lubricate and cool the seal and bearing mounted thereon. The receptacle 32 is for example clipped or screwed onto the surface of the casing on the side of the bearing housing 17. More specifically, the receptacle 32 is adapted to conform to an upper angular portion 36 of the bearing housing 17 on which it is arranged and to communicate, via a channel 38 passing through this upper angular portion of the bearing housing 17 with a gap 40 between the bearing 16 and the dynamic seal 18 which extends the housing wall to seal the machine at the output of the rotary shaft 15. The oil thus effectively lubricating the ball bearings 16 as well as the dynamic seal 18. A recess is also provided so that oil flowing between the dynamic seal 18 and the ball bearing 16 does not completely fill the seal housing and can be discharged into the bottom of the housing.

Thus, in this cold cooling mode, the active parts of the electric machine 10 are only cooled by the oil projected by the rotor 13 when the latter rotates and the bearings 16 of the machine 10 are also lubricated by the oil projected by the rotor 13 during its operation. The pump 22 of the oil circulation circuit 20 is here stopped, and, is therefore not biased in this cold cooling mode where the viscosity of the oil is large, which advantageously allows smaller dimensioning of the pump 22, by reducing the power required for it and starting, a lower cost of the pump to the benefit of the competitiveness of the electric machine cooled by the system of the invention.

On the other hand, as soon as the temperature of the oil reaches the predefined threshold, for example 0° C., from which the viscosity of the oil converges rapidly at low values, a second, so-called hot cooling mode, is implemented, in which the pump 22 is started. The start of the pump 22 is therefore advantageously controlled by the temperature of the oil measured by the temperature sensor 31. The pump 22 is activated, the oil is then supplied to the circulation circuit 20 through the strainer system 23 and the heat exchanger 24, then, on the one hand, towards the passage 26 provided in the housing bottom for watering the rotor and the bearing and, on the other hand, towards the secondary reservoir 27 situated in the upper part of the casing, which will fill.

With the start of the pump 22 and the filling of the secondary reservoir 27, the level of oil 30 in the casing will decrease to the new level of oil referenced 40 in FIG. 1, and the contact of the oil with the rotor is thus limited. This advantageously makes it possible to reduce the mechanical losses by friction due to the resistive torque generated by the oil in contact with the rotor 13 and in the air gap, in particular when increasing the operating speed of the machine and thus to improve the efficiency of the machine, for oil temperatures above the predefined threshold. In particular, it can be mounted at speeds of greater than 14000 rpm, up to 16000 to 20000 rpm, without degrading the efficiency, thanks to the pump which will operate at the oil temperatures above said threshold.

Figure 2:
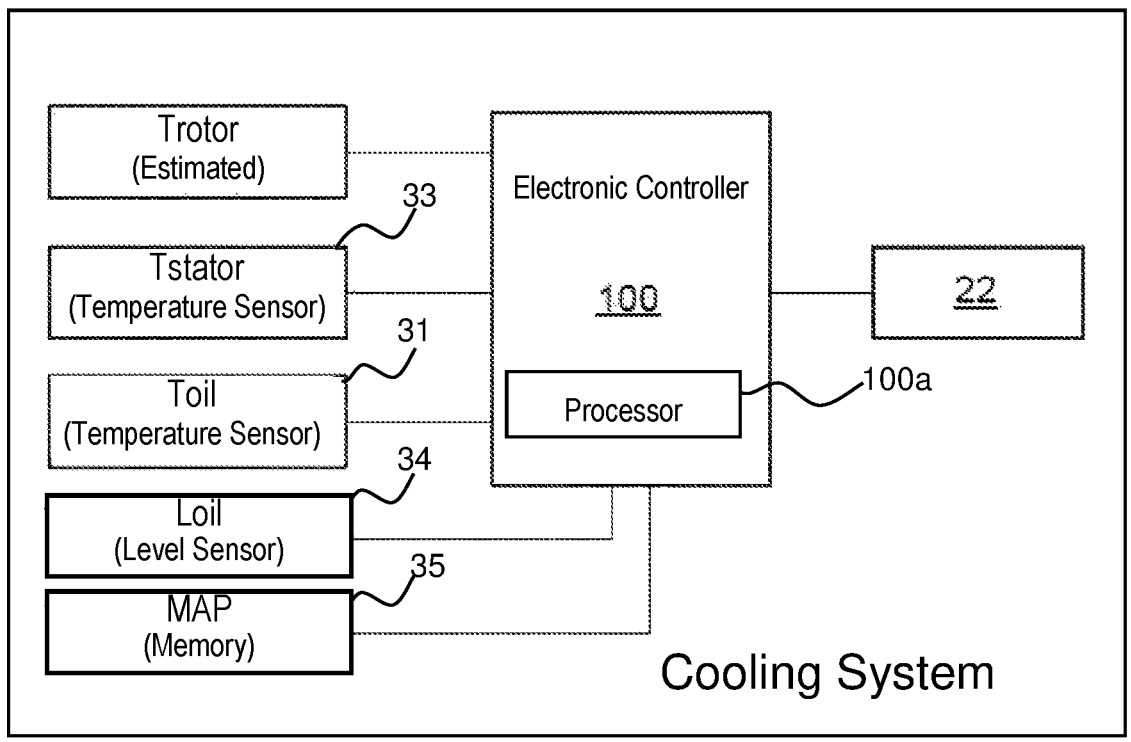
FIG. 2 is a schematically represents the operation of the electronic controller associated with the pump.

The pump 22 can be controlled in an optimized manner according to several criteria. Referring to FIG. 2, the cooling system is provided with an electronic controller 100 controlling for the pump 22. The electronic controller 100 is preferably a microcomputer or central processing unit (CPU) that includes at least one processor 100a. The electronic controller 100 is formed of one or more semiconductor chips that are mounted on a circuit board. The term "electronic controller" as used herein refers to hardware that executes a software program, and does not include a human being. The electronic controller 100 can be one or more integrated circuits having firmware for causing the circuitry to complete the activities of the pump 22 described herein.

The electronic controller 100 is particularly suitable for controlling the stopping/starting of the pump 22, depending on the received measurement of the oil temperature Toil, as explained above. The electronic controller 100 of the pump 22 are also adapted to control the flow rate of the pump 22 as a function of the cooling requirement of the machine 10, defined as a function of the temperature of the active parts of the machine 10 and taking into account the oil temperature. The temperature of the active parts of the machine 10 is for example provided by an estimate of the rotor temperature Trotor and by a measurement of the stator temperature Tstator, acquired by a temperature sensor 33 installed at the stator 12.

The electronic controller 100 can also be adapted to control the flow rate of the pump 22 as a function of the level of oil in the casing 11. In this regard, the electronic controller 100 are provided for ensuring a minimum flow rate of the pump 22 in order to empty the main oil reservoir 21 in order to reach an oil level capable of limiting the oil-rotor contact.

The electronic controller 100 can also be adapted to control the flow rate of the pump 22 as a function of the lubrication requirement of the machine 10. The flow rate control can be defined, for example, from a Carto map stored in memory 35. The memory 35 can be separate from the electronic controller 100 or integrated with the electronic controller 100. In this way, it possible to guarantee a minimum flow delivered by the pump 22 for lubrication purposes.

In the case where the noise emitted by the pump 22 is greater than the noise emitted by the machine 10, the electronic controller 100 can also be adapted so as to limit the speed of the pump 22, or even to stop. In order to objectively quantify the noise emitted by the machine 10 or the pump 22 during operation, different methods for evaluating noise can be used, for example by analyzing the acoustic power produced. In the case where the operating conditions involve a need for lubrication or cooling of the machine 10, if the pump 22 is stopped or sees its limited regime, the machine will normally risk reaching its thermal limits and/or the seals or bearings will cause degradation. However, in the cooling system according to the present disclosure, even if the pump 22 is stopped or limited so that its noise is less than the noise of the machine 10, any lubrication or cooling defect is advantageously eliminated, since the secondary oil reservoir 27 will then empty in order to cool the machine 10, so that the oil level again increases in the casing at the level 30 as illustrated in FIG. 1 and the rotor 13 will bathe in the oil in order to ensure the proper operation of the cooling by bubbling of the rotor 13.

What is claimed is:

1. A cooling system for cooling an electric machine including a casing, a rotor having a rotary shaft supported by at least one bearing housing of the casing receiving end of the rotary shaft via a bearing, a stator fixed to an inner wall of the casing and surrounding the rotor, the cooling system comprising:
    a cooling liquid circulation circuit configured to bring a cooling liquid into contact with the stator and the rotor;
    a main reservoir located at a first part of the casing, and configured to receive the cooling liquid;
    a receptacle attached to a surface of the casing on a side of the at least one bearing housing, the receptacle being configured to guide the cooling liquid towards the at least one bearing housing to lubricate and cool the bearing;
    a pump connected to the main reservoir, and configured to inject the cooling liquid into the cooling liquid circulation circuit; and
    an electronic controller operatively coupled to the pump to control the pump as a function of at least a temperature of the cooling liquid,
    the main reservoir having a predetermined liquid volume,
    the cooling liquid circulation circuit fluidly communicating with a secondary reservoir located at a second part of the casing,
    the electronic controller being configured to maintain the pump off when the temperature of the cooling liquid is below a prescribed threshold temperature, and
    the electronic controller being further configured to start the pump upon the temperature of the cooling liquid reaching the prescribed threshold temperature by controlling the pump to suck cooling liquid from the main reservoir into the circulation circuit and to the secondary reservoir.

2. The cooling system according to claim 1, wherein
the secondary reservoir includes at least one outlet arranged at a periphery of the stator, and provided with a variable flow nozzle capable of spraying a portion of a longitudinal outer surface of the stator with the cooling liquid.

3. The cooling system according to claim 2, wherein
the least one outlet includes two outlets located opposite each other, or an outlet including a nozzle spraying a central peripheral portion of the stator.

4. The cooling system according to claim 1, wherein
the cooling liquid circulation circuit includes at least one first adjustable flow nozzle arranged in the casing so as to spray coil heads of the rotor and at least one second adjustable flow nozzle arranged in the casing so as to spray the bearing.

5. The cooling system according to claim 1, wherein
the electronic controller is configured to control a flow rate of the pump based on a level of the cooling liquid in the casing.

6. The cooling system according to claim 1, wherein
the electronic controller is configured to control a flow rate of the pump as a function of a rotor temperature and a stator temperature.

7. The cooling system according to claim 1, wherein
the electronic controller is configured to control a flow rate of the pump based on a lubrication requirement of the machine.

8. The cooling system according to claim 1, wherein
the electronic controller is configured to at least limit a speed of the pump, or stop the pump, when a noise emitted by the pump is greater than a noise emitted by the electric machine.

9. The cooling system according to claim 1, wherein
the receptacle is adapted to mate with an upper angular portion of the bearing housing on which the receptacle is arranged, the receptacle being configured to communicate, through a channel passing through the upper angular portion of the bearing housing, with a gap between the bearing and a dynamic seal, the dynamic seal extending as a wall portion of the casing to seal the machine at the outlet of the rotary shaft.

10. An electric or hybrid motor vehicle comprising the cooling system for cooling the electric machine according to claim 1,
wherein the electric machine is an electric traction machine.

* * * * *